United States Patent [19]
Ridgley

[11] Patent Number: 5,956,079
[45] Date of Patent: *Sep. 21, 1999

[54] AGRICULTURAL VEHICLE MONITORING SYSTEM

[75] Inventor: William S. Ridgley, Harlan, Iowa

[73] Assignee: Agriland Designs, Inc., Harlan, Iowa

[*] Notice: This patent is subject to a terminal disclaimer.

[21] Appl. No.: 08/808,472

[22] Filed: Mar. 3, 1997

[51] Int. Cl.[6] ........................................ H04N 7/18
[52] U.S. Cl. ..................... 348/89; 348/120; 348/148; 348/82
[58] Field of Search ............... 348/89, 120, 148, 348/143, 82; 111/119

[56] References Cited

U.S. PATENT DOCUMENTS

| | | | |
|---|---|---|---|
| 3,662,853 | 5/1972 | Love | 180/121 |
| 3,689,695 | 9/1972 | Rosenfield et al. | 178/7.81 |
| 4,277,804 | 7/1981 | Robinson | 358/108 |
| 4,288,814 | 9/1981 | Talley et al. | 358/93 |
| 4,365,268 | 12/1982 | Allen et al. | 358/93 |
| 4,386,848 | 6/1983 | Clendenin et al. | 356/5 |
| 4,652,204 | 3/1987 | Arnett | 414/751 |
| 5,845,592 | 12/1998 | Ridgley | 111/119 |

*Primary Examiner*—Tommy P. Chin
*Assistant Examiner*—John A. Voisinet
*Attorney, Agent, or Firm*—G. Brian Pingel

[57] ABSTRACT

A monitoring system for an agricultural vehicle. The vehicle is provided with a video camera and an associated video monitor. The video monitor is located in a cab of the vehicle and the video camera is oriented facing the rear of the vehicle. When an agricultural implement is connected to the vehicle, the monitor may be used to view the implement without turning away from the direction of travel.

11 Claims, 6 Drawing Sheets

AGRICULTURAL VEHICLE MONITORING SYSTEM

BACKGROUND OF THE INVENTION

1. Field of the Invention

The present invention relates to an agricultural vehicle monitoring system and, more particularly, to an agricultural vehicle having a video camera and video monitor to monitor activity around the agricultural vehicle.

2. Description of the Prior Art

It is well-known in the art to use a pulling vehicle, such as a tractor, in conjunction with an applicator, such as a tool bar or planter. One major drawback of such combinations is the inability of the operator to simultaneously view both the direction of travel and the applicator.

Farm land is often rough and uneven. Accordingly, an operator of an agricultural vehicle must closely monitor the direction of the vehicle's travel to avoid drifting. The operator, however, must also monitor any applicator being towed behind the agricultural vehicle. If the applicator is not monitored, a problem with the applicator could go unchecked. Problems could range from having to retrace a particular area of ground to a hazardous waste cleanup in the event of leaking material. Often hazardous material, such as anhydrous ammonia, is being applied to the soil. If a leak were to occur during the application of the anhydrous ammonia, it may be several minutes before the operator turns around and notices the problem. Such a delay could result in a large loss of relatively expensive anhydrous ammonia. Additionally, if it is unclear when the leak began, it is difficult to determine how much of the soil must be reinjected with anhydrous ammonia. Most importantly, loss of a significant amount of anhydrous ammonia into the atmosphere could result in a harmful, or even potentially life threatening, situation if the anhydrous ammonia were inhaled by the operator or by persons standing nearby during the application process. Additionally, for commercial agricultural application concerns, an operator is often contracted to work a field with which he is unfamiliar. In such a circumstance, the operator often has to "guess" where to begin applying product. An incorrect "guess" could waste valuable product or even damage existing crops. It would, therefore, be desirable to be able to transmit visual images to a remote location. Persons at this remote location could then compare the visual information to instruct the operator where to begin and where to end the application process.

The difficulties encountered hereinabove are sought to be eliminated by the present invention.

SUMMARY OF THE INVENTION

The present invention comprises a vehicle having a chassis, a video camera and an associated video monitor. In the preferred embodiment, the video monitor is located in a cab of the vehicle and the video camera is oriented facing the rear of the vehicle. When an agricultural implement is connected to the vehicle, the monitor may be used to view the implement, without forcing the operator to turn away from the direction of travel.

Preferably, the video camera is provided with pan, zoom and tilt capability. Operator controls for these functions are placed within the cab, next to the video monitor. An operator can thereby monitor various aspects of the agricultural implement, and even get a close-up detailed view of a specific problem area.

DETAILED DESCRIPTION OF THE PREFERRED EMBODIMENT

Figure 1:
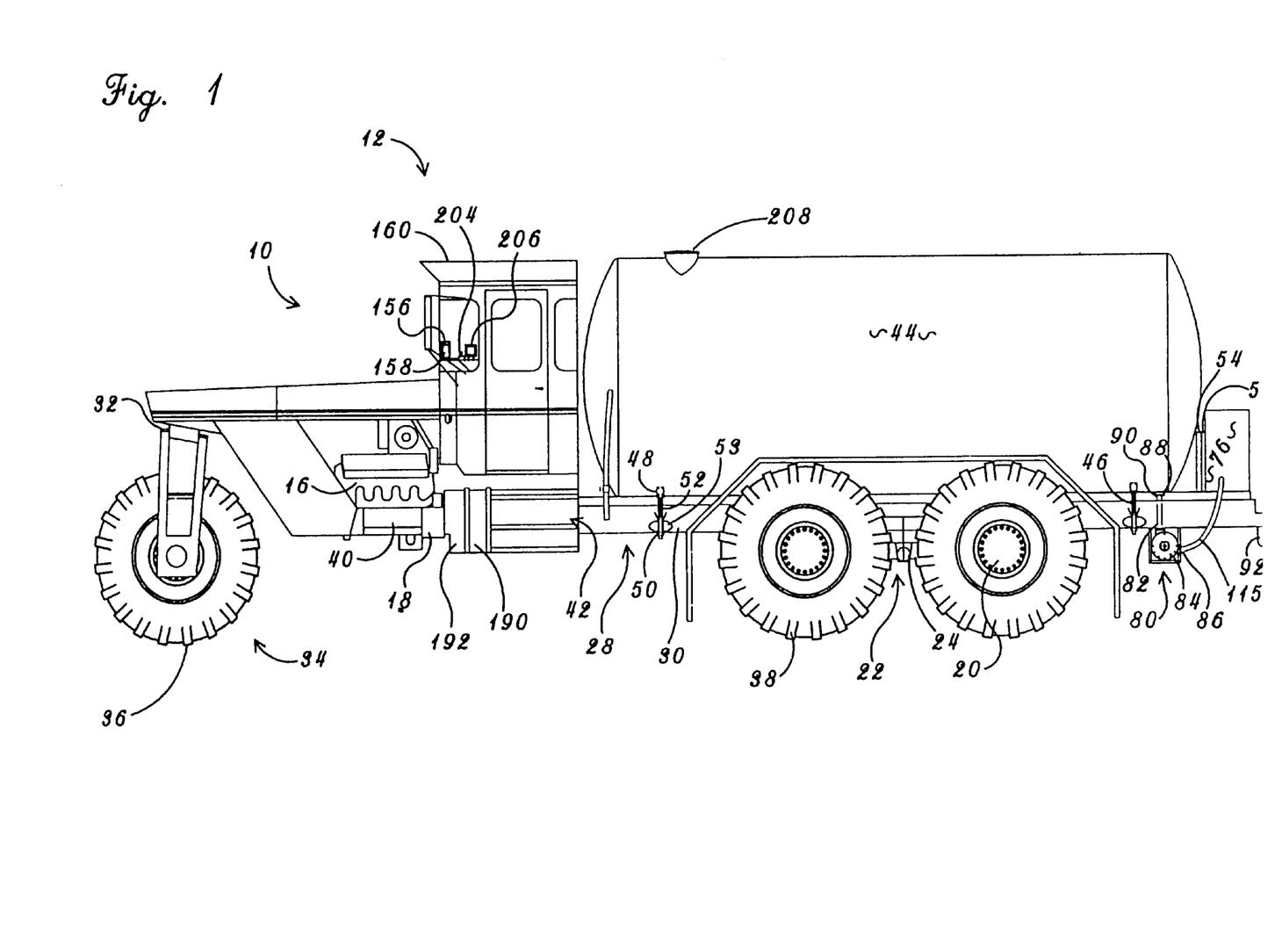
FIG. 1 is a side view of the pulling vehicle of the present invention.
Figure 2:
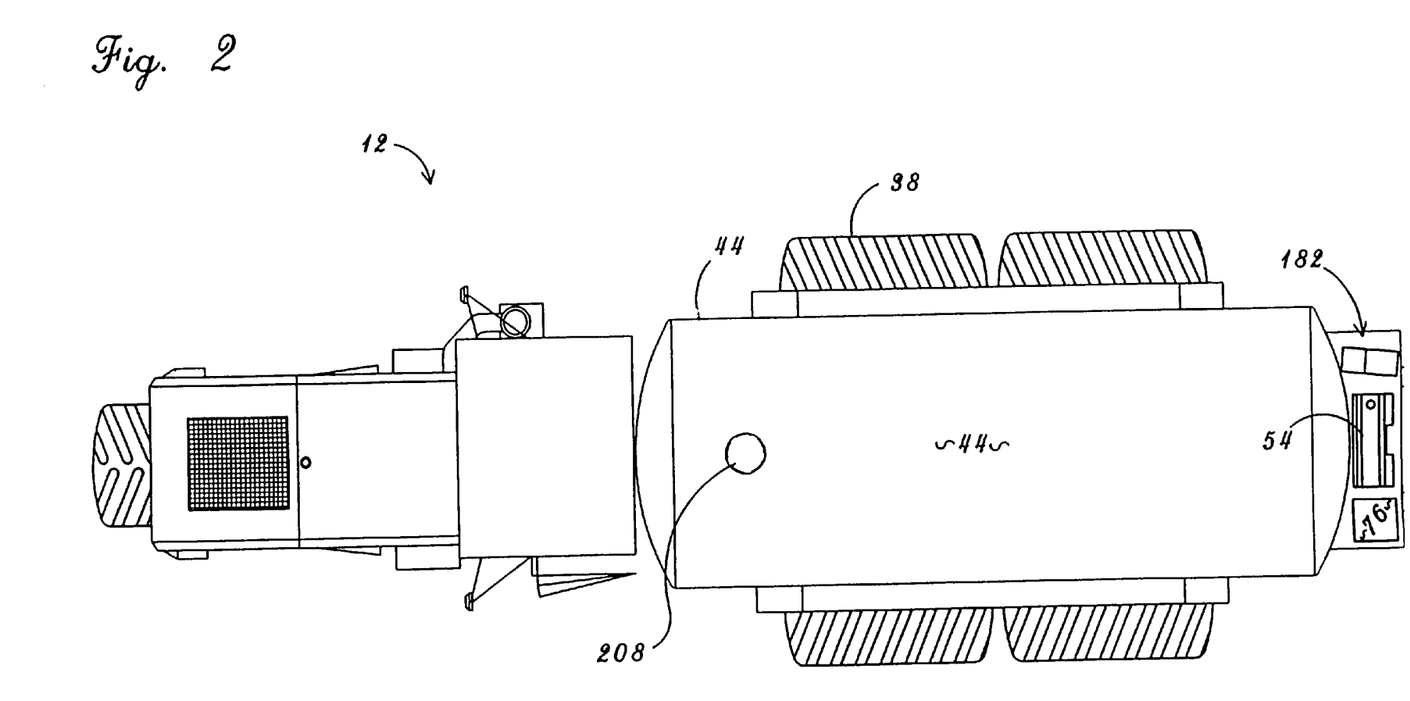
FIG. 2 is a top view of the pulling vehicle of FIG. 1.
Figure 4:
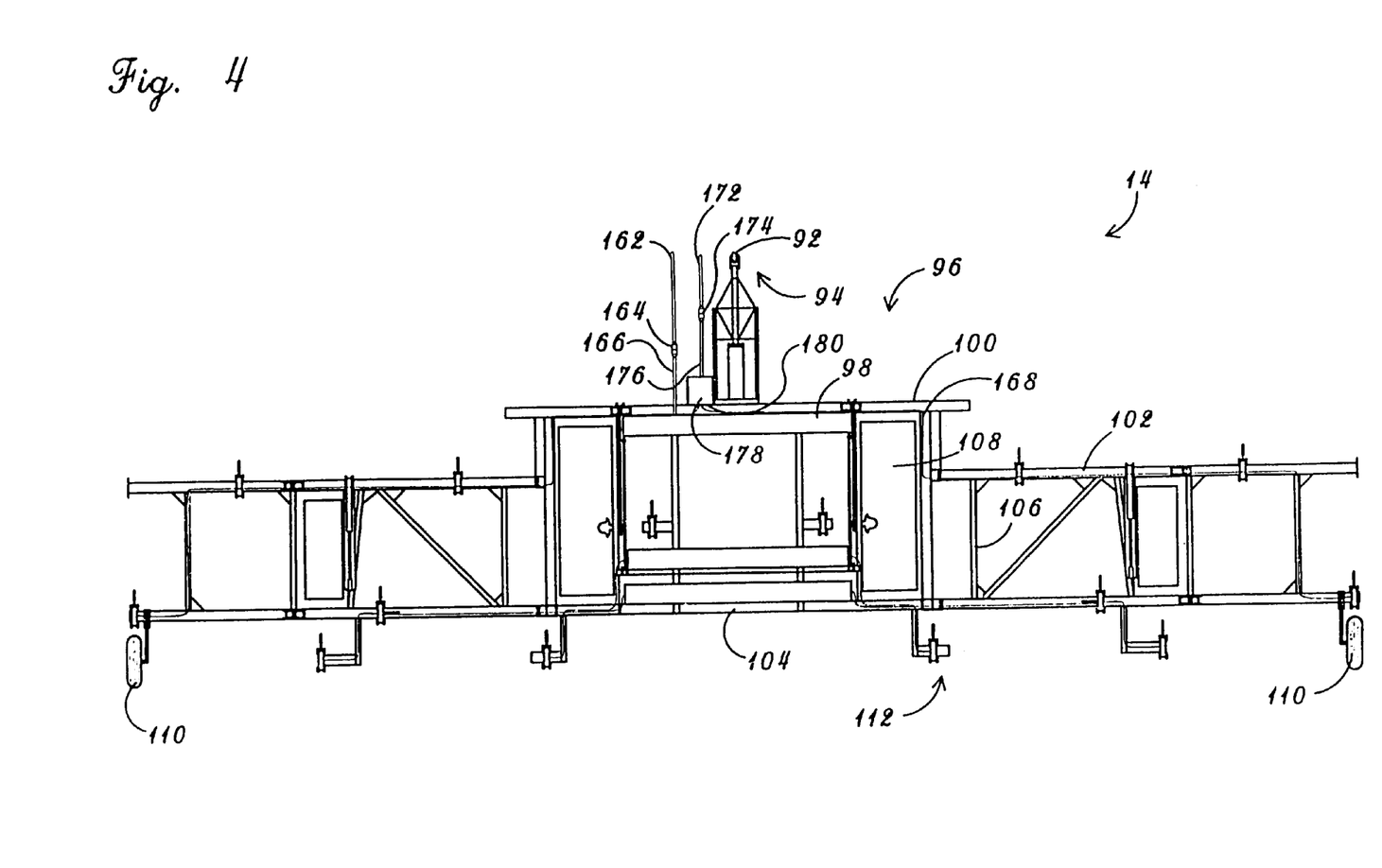
FIG. 4 is a top elevation of the tool bar of the present invention.

With reference to the drawings, shown in FIGS. 1 and 4, is an anhydrous ammonia applicator 10 having a pulling vehicle 12 and a tool bar 14. In the preferred embodiment, the pulling vehicle 12 is a field floater chassis such as that distributed by Ag-Chem under the name Terra-Gator®, 2505, which has a payload capacity of over ten thousand kilograms and preferably a payload capacity of eighteen thousand nine hundred and fifteen kilograms. While the pulling vehicle 12 may be any vehicle capable of carrying an anhydrous ammonia tank and pulling a tool bar, the large payload capacity, large towing capacity, and maneuverability of the field floater chassis make it particularly well-suited for the present application. The engine 16 is a Caterpillar® 3176B Turbocharged/Air to Air Aftercooled in-line six cylinder diesel with four hundred SAE horsepower at 2100 RPM and a peak torque of 1,282 foot pounds at 1500 RPM.

The transmission 18 is an Eaton Fuller® RTLO-14718-A, close ratio, manual having eighteen speeds forward, four in reverse and a torque capacity of 1,650 foot pounds. The tandem rear axles 20 are preferably Rockwell-International outboard planetary final reduction type. The tandem axle configuration has full time 4-wheel drive, and cab-controlled lockable interaxle differential (not shown) which may be shifted from the locked position for maximum traction to the unlocked position for minimum tire wear. The rear suspension system 22 is a tandem walking beam type with rigid saddles 24 which allows the axles to oscillate independently over rough ground.

The pulling vehicle 12 is provided with dual air brake system (not shown) which activates wedge-type drums. The pulling vehicle 12 is provided with a frame 28 having main frame rails 30 constructed of stress-relieved rectangular wall steel tubing. The pulling vehicle 12 is provided with a hydrostatic steering system 32 directing a single front wheel 34. Provided around the front wheel 34 is a front tire 36 similar in construction to four rear tires 38. All five tires 36 and 38 are 66×43.00–25 flotation tires, with a 10-ply rating. All tires are provided with a locking ring (not shown) and an O-ring (not shown) on the inside of the wheel 34.

The pulling vehicle 12 is provided with a twelve-volt electrical system 40 with three 650 cold cranking amp batteries (not shown) and a one hundred and twenty amp alternator (not shown). The pulling vehicle 12 is also provided with an air system 42 having a 428.9 liter per minute compressor (not shown) governed at 8.28 bar. The air system 42 is also provided with dual 19,680 cubic centimeter reservoirs (not shown) and an air dryer (not shown). Secured onto the frame 28 of the pulling vehicle 12 is an anhydrous ammonia tank 44. The anhydrous ammonia tank 44 is constructed of steel with a capacity of 13,960 liters of anhydrous ammonia. The anhydrous ammonia tank 44 may be of any desired capacity from 5,700 liters to 32,000 liters. The anhydrous ammonia tank 44 is coupled to the frame 28 with a plurality of bolts 46. The bolts 46 are coupled to the tank 44 by a plurality of hinges 48. The ends of the bolts 46 are threaded and provided with nuts 50. The two forwardmost bolts 46 are provided with springs 52 to prevent torsion of the frame 28 from being transmitted to the tank 44. For each bolt 46, the frame 28 is fitted with a V-shaped retainer 53 which guides the bolts 46 and secures them to the frame 28.

Figure 3:
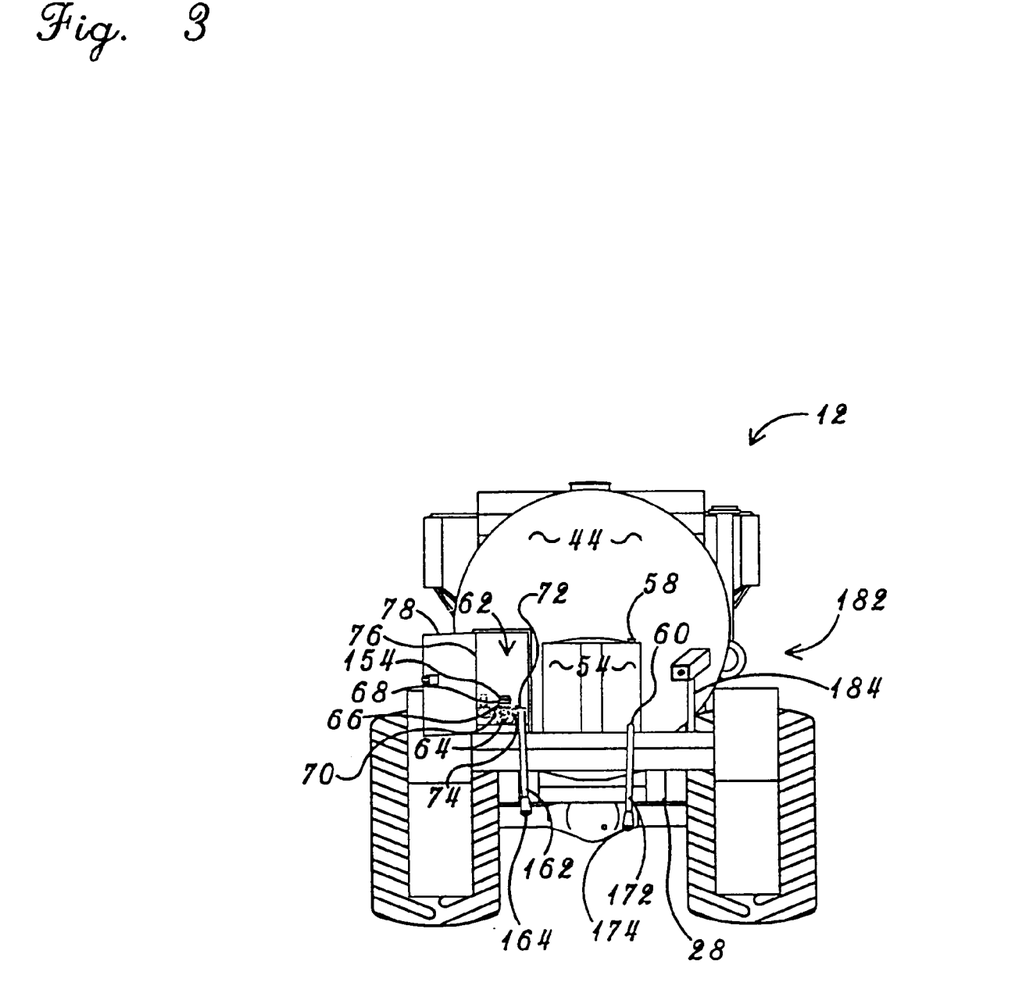
FIG. 3 is a rear view of the pulling vehicle of FIG. 1.

As shown in FIGS. 1 and 3, secured to the rear of the frame 28 is a corrosion resistant liquid container 54. In the preferred embodiment, the container 54 is constructed of crosslink polyolefin, but may be constructed of stainless steel or any material which is substantially chemically inert. The container 54 has a four hundred and sixteen liter capacity, but may have a capacity in the range of fifty liters to one thousand liters, or may have any desired capacity. The container 54 is approximately one meter high, one meter long and one meter deep. The container 54 is preferably attached to the frame 28 by straps 56 or similar releasable securement system to allow the container 54 to be removed from the pulling vehicle 12 when only anhydrous ammonia is being applied. The container 54 is also provided with a fluid inlet 58 and a fluid outlet 60. In the preferred embodiment, the container 54 is filled with a nitrogen stabilizing material such as a nitrapyrin/pyridine/xylene mixture. While the container 54 is filled with N-SERVE nitrogen stabilizer manufactured by Dow Elanco® of Indianapolis, Ind. in the preferred embodiment, the container may, of course, be filled with any agricultural product including, but not limited to, fertilizers such as potash and phosphate, pesticides and/or herbicides.

Secured to the frame 28, next to the container 54, is a fluid meter 62. In the preferred embodiment, the meter 62 is a Liquid Controls Corporation® MA-5 positive displacement meter or similar type meter such as those known in the art. The meter 62 is provided with a metering assembly 64, a digital display counter 66, and a printer 68. A fluid intake 70 is provided below and forward of the metering assembly 64 and a differential valve 72 is secured to an outlet 74 of the meter 62. In the preferred embodiment, the meter 62 has a maximum capacity of two hundred twenty seven liters per minute, a maximum working pressure of 25 bar and weighs approximately ten kilograms. The meter 62 is preferably provided within a housing 76 secured to the frame 28. the housing 76 is constructed of steel and is provided with a door 78 to allow access to the meter 62, while preventing the meter 62 from being damaged by the elements or by materials being applied by the applicator 10.

As shown in FIG. 1, a pump 80 is secured to the frame 28 to pump anhydrous ammonia from the tank 44. In the preferred embodiment, the pump is a Corken® Z2000 Coro-vane® vane pump. The pump 80 is provided with an inlet 82, a blade housing 84 and an outlet 86. Coupled between an outlet 88 of the tank 44 and the inlet 82 of the pump 80 is an excess flow valve 90. The excess flow valve 90 may be of any type known in the art and is provided to shut off the flow of anhydrous ammonia from the tank if the rate of flow exceeds a predetermined rate.

Secured to the rear of the frame 28 is a hitch 92. Due to the large pulling capacity of the pulling vehicle 12, the hitch 92 is preferably a large capacity hitch having a capacity of forty-five metric tons. As shown in FIG. 4, the tool bar 14 is secured to the pulling vehicle by the hitch 92. Although the tool bar 14 may be of any type known in the art, in the preferred embodiment the tool bar 14 is a Nutri-Plac'r® 5300 pull-type applicator which is 16 meters wide. The tool bar 14 is provided with a hitch assembly 94 and a main frame 96 as shown in FIG. 4. Secured to the main frame 96 are three Raven Industries, Inc. super-coolers 98 or similar refrigeration devices electrically powered by the pulling vehicle 12. The super-coolers 98 use expansion of anhydrous ammonia to cool the anhydrous ammonia to a temperature sufficient to maintain the anhydrous ammonia in a liquified state until the anhydrous ammonia is pumped into the soil.

As shown in FIG. 4, the main frame 96 comprises a front support bar 100 and a pair of lateral support bars 102 and a rear support bar 104. These support bars 100, 102, and 104 are connected to one another by a plurality of longitudinal supports 106. Secured to the tool bar 14 between the front support bar 100 and the rear support bar 104 are a pair of main wheels 108. With tires, the wheels 108 are about 1.5 meters in diameter and approximately 27 centimeters wide. Secured to the rear support bar 104 near the outer edges of the rear support bar 104 are a pair of outrigger wheels 110.

Figure 7:
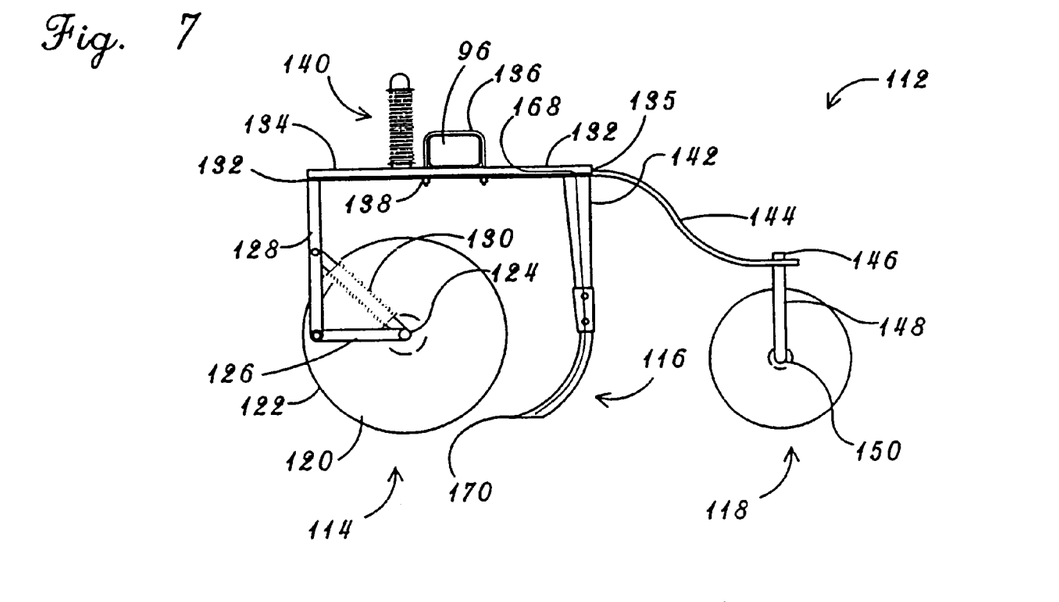
FIG. 7 is a side elevation of the injection assembly of the present invention.

As shown in FIG. 4, the tool bar 14 is preferably provided with twenty-one injection assemblies 112 spaced slightly less than one meter apart. As shown in FIG. 7, each injection assembly 112 comprises an opener 114, a knife 116, and a pair of closers 118. The opener 114 comprises a metal disk 120 having a sharp beveled edge 122. An arbor 124 secures the disk 120 to a pivot arm 126. The pivot arm 126, in turn, is hingably coupled to a support arm 128.

Secured between the arbor 124 and the support arm 128 is a compression spring assembly 130. The compression spring assembly 130 allows the pivot arm 126 to pivot upward when the metal disk 120 encounters a rock or is otherwise placed under an extreme load. This pivoting action limits damage to the metal disk 120 and extends the life of the opener 114. The support arm 128 is secured to a mounting bracket 132. The mounting bracket 132 is coupled to a stationary plate 134 by a hinge 135. The stationary plate 134 is wider than the mounting bracket 132 to allow the stationary plate 134 to be secured to the main frame 96 by a pair of U-bolts 136 and nuts 138 which straddle the mounting bracket 132. The mounting bracket 132 is also secured to the stationary plate 134 by a compression spring assembly 140 which allows the mounting bracket 132 to pivot relative to the stationary plate 134 when the injection assembly 112 encounters a rock or is otherwise placed under an extreme load.

Depending from the mounting bracket 132, rearwardly from the opener 114, is a knife support bar 142. The knife 116 is secured to the knife support bar 142 by bolts or similar securement means known in the art. The knife 116 is preferably beveled to allow the knife 116 to pass easily through soil.

Extending from the mounting bracket 132, behind the knife 116, is a closer support bar 144. The closer support bar 144 is secured to a closer bracket 146. The closer support bar 144 extends laterally to either side of the closer bracket 146 to accommodate a pair of depending closer arms 148. The closer arms 148 are secured to the closers 118 by a pair of arbors 150. Each closer in each pair of closers 118 is preferably convex, relative to the closer 118 with which it is paired, to aid in pushing soil together after material has been injected into the soil at the knife 116.

Since the pump 80 is located below the tank 44, gravity draws anhydrous ammonia out of the tank 44 through the outlet 88 of the tank 44 (FIG. 1). The anhydrous ammonia moves through the excess flow valve 90 and into the inlet 82 of the pump 80. The pump 80, which is hydraulically driven by the engine 16 of the pulling vehicle 12, moves the anhydrous ammonia through the outlet 86 and through a hose 113 to the fluid meter 62 (FIGS. 1 and 3). Coupled to the fluid meter 62 is a pulse generator 154. As the anhydrous ammonia moves through the meter 62, the pulse generator 154 generates an electronic pulse which wires (not shown) transfer from the meter 62 to a receiver 156 coupled to a central processing unit (CPU) 158 located in a cab 160 of the pulling vehicle 12. In the preferred embodiment, the CPU 158 is a notebook-type personal computer with a Pentium® processor and a liquid crystal display. The CPU 158 translates pulses received from the pulse generator 154 into information regarding the flow of anhydrous ammonia and the CPU 158 displays this information on the liquid crystal display of the CPU 158.

From the fluid meter 62, the anhydrous ammonia moves through a hose 162 which is connected via a quick-disconnect type coupling 164 to a hose 166 provided on the tool bar 14 (FIGS. 3–4). The hose 166 is, in turn, connected to the super-coolers 98 provided on the tool bar 14 (FIG. 3). The super-coolers 98 are coupled to the injection assemblies 112 via a series of smaller hoses 168. As shown in FIG. 7, each of the smaller hoses 168 is secured to a knife 116 and terminates in an opening 170 at the tip of the knife 116.

In a similar fashion, a hose 172 is secured to the fluid outlet 60 of the liquid container 54 (FIG. 3). The hose 172 is connected to another hose 176 via a quick-disconnect type connector 174 (FIG. 4). As shown in FIG. 4, the hose 176 is connected to a pump and meter assembly 178 located on the tool bar 14. The pump and meter assembly may be of any type known in the art for pumping and metering liquid. Smaller hoses 180 are coupled between the pump and metering assembly 178 and the smaller hoses 168 which move the N-SERVE. Accordingly, material located within the liquid container 54 can be transferred from the liquid container 54, through the smaller hoses 168, to be distributed in confluence with the anhydrous ammonia through each opening 170 of the smaller hoses 168 at the tip of each knife 116 (FIGS. 3, 4 and 7).

Figure 8:
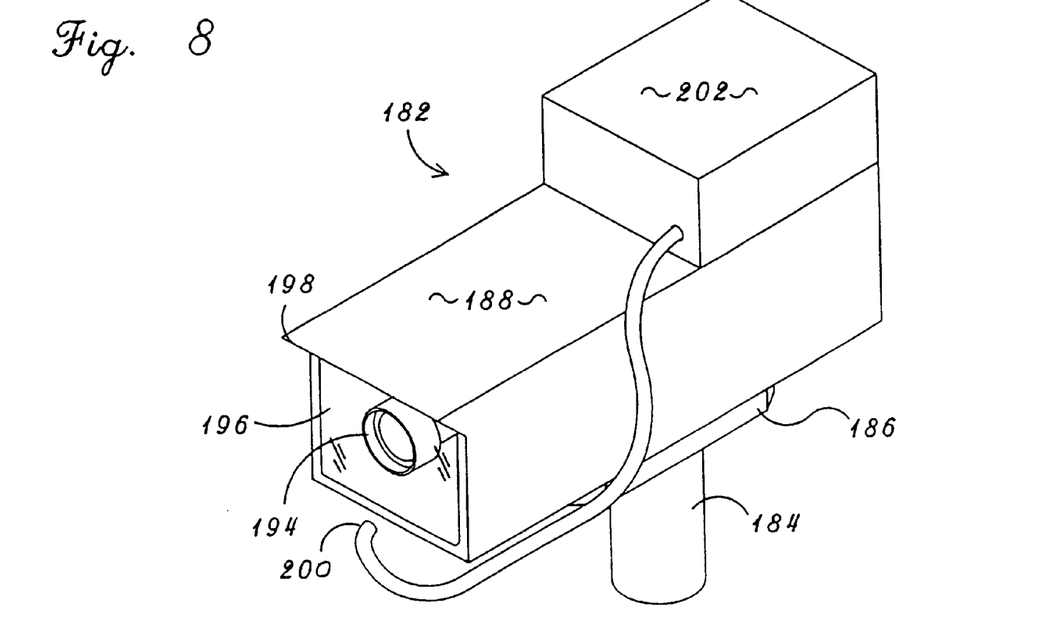
FIG. 8 is a perspective view of the video monitoring system of the present invention.

To monitor the tool bar 14, the frame 28 of the pulling vehicle 12 is fitted with a camera assembly 182 as shown in FIG. 3. A detailed view of this assembly 182 is shown in FIG. 8. As shown in FIGS. 3 and 8, the camera assembly 182 comprises a hollow support cylinder 184 secured to a pan/tilt assembly 186. The pan/tilt assembly may be of any type known in the art, but is preferably of a weather resistant type. The pan/tilt assembly 186 is secured to a protective housing 188. The support cylinder 184 is secured to the frame 28 of the pulling vehicle 12 by bolts or any similar securement means.

In the preferred embodiment, the pan/tilt assembly 186 is powered by alternating current. Since the pulling vehicle 12 only generates direct current, the pulling vehicle 12, as shown in FIG. 1, is provided with a direct-current-to-alternating-current convertor 190 secured within a protective housing 192. The convertor 190 is wired directly to the pan/tilt assembly 186 (FIGS. 1 and 8).

The protective housing 188 is preferably constructed of sheet steel, but may, of course, be constructed of any suitable material (FIG. 8). Secured within the protective housing 188 is a video camera 194. Provided at the front of the protective housing 188 is a window 196 constructed of transparent plastic or other similarly suitable material. The protective housing 188 is also provided with an awning 198 to protect the window 196 from rain and other damage from the environment. Positioned below the window 196 is a blower 200 which moves a constant stream of filtered air across the window 196 to keep the window 196 free of debris. Filtered air is supplied to the blower 200 via a hydraulically driven air pump system 202 such as those well-known in the art.

The video camera 194 is powered by alternating current from the direct-current-to-alternating-current converter 190 (FIGS. 1 and 8). The video camera 194 is preferably provided with zoom capabilities to allow the video camera 194 to take close-up shots of various aspects of the tool bar 14. The video camera 194 and pan/tilt assembly 186 are wired to a control unit 204 and video monitor 206 located in the cab 160 of the pulling vehicle 12 (FIGS. 1 and 8). Using the control unit 204, an operator (not shown) can manipulate the camera assembly 182 to display different portions of the toolbar 14 on the video monitor 206.

Figure 5:
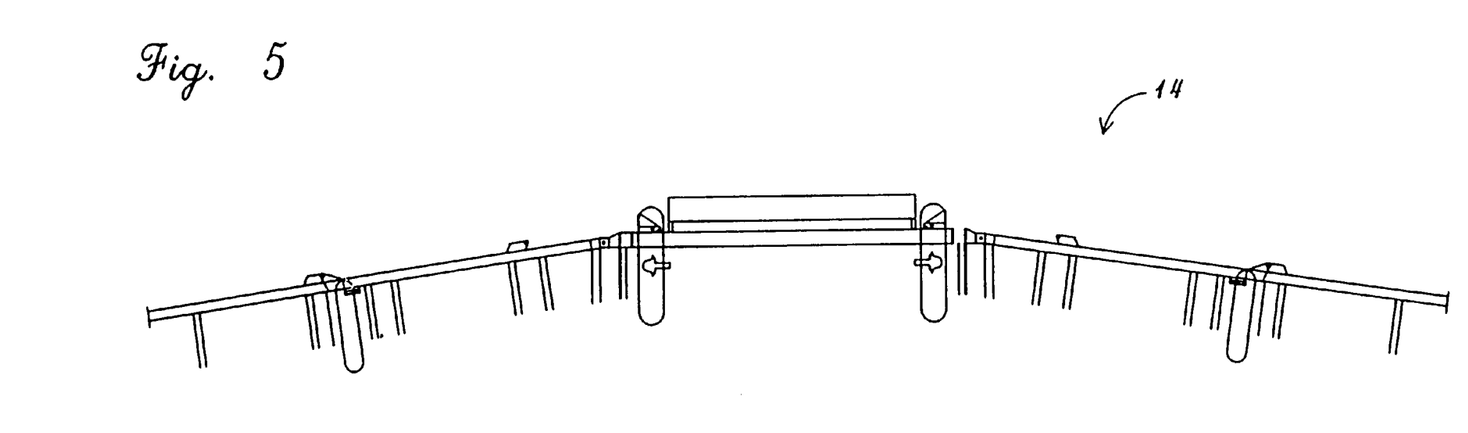
FIG. 5 is a rear elevation of the tool bar of FIG. 4.
Figure 6:
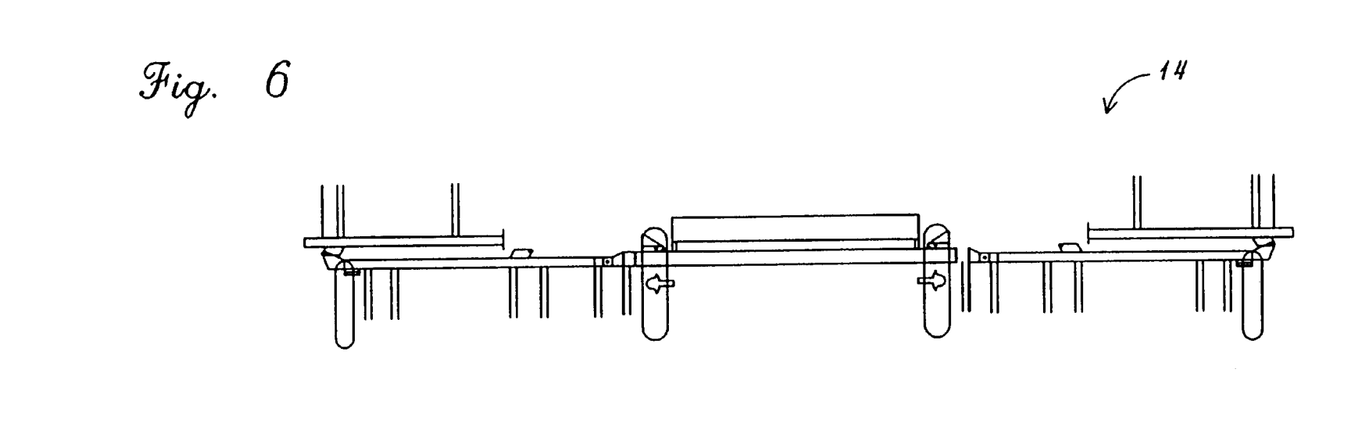
FIG. 6 is a rear elevation of the tool bar of FIG. 4 shown in the folded position.

To begin the application process, the anhydrous ammonia tank 44 is filled with anhydrous ammonia and the tool bar 14 is connected to the pulling vehicle 12 by the hitch assembly 92 (FIG. 1). The hoses 162 and 172 are connected via the quick-disconnect type couplers 164 and 174 to the hoses 166 and 176 of the tool bar 14 (FIG. 4). Additional electrical systems such as brake lights (not shown) provided on the tool bar may be coupled to the pulling vehicle via a quick-disconnect type electrical connector (not shown) so that all of the couplings to the tool bar 14 are of the quick-disconnect type. The quick-disconnect couplings prevent damage to the hoses 162, 166, 172 and 176, if the tool bar 14 were to become unintentionally disconnected from the pulling vehicle 12 (FIGS. 3–4). As shown in FIGS. 5 and 6, the tool bar 14 can be folded in on itself for transport or storage.

Once the tool bar 14 is coupled to the pulling vehicle 12, an operator (not shown), located within the cab 160 of the pulling vehicle 12, can actuate the pump 80 and pump and metering assembly 178 which are preferably wired to the CPU 158 (FIGS. 1 and 4). As the pulling vehicle 12 moves forward, the operator can monitor the tool bar 14 by manipulating the camera assembly 182 with the control unit 204 (FIGS. 1, 4 and 8). Additionally, the operator can monitor the amount of anhydrous ammonia or other material being applied via the monitor of the CPU 158. As anhydrous ammonia is pumped from the tank 44 and into the soil through each knife 116, each metal disk 120 of each opener 114 cuts a shallow trench (not shown) into which anhydrous ammonia and any other desired material is deposited by each knife 116 (FIGS. 1 and 7). After the anhydrous ammonia and other material has been deposited, the closers 118 move the soil back over the trench created by the metal disk 120 of the opener 114.

The large surface area of the tires 36 and 38 of the pulling vehicle 12 prevent undesirable compaction of the soil, and since there is no tank or other heavy object being pulled behind the tool bar 14, there is no post-injection compaction of the soil. Once an operator has delivered a sufficient amount of anhydrous ammonia or other material, the operator shuts down the pumps 80 and 178 with the central processing unit 158 and stops the pulling vehicle 12 (FIGS. 1 and 4). Once application has stopped, the operator can open the housing 76 for the fluid meter 62 and remove a printed receipt (not shown) from the printer 68 showing the quantity of anhydrous ammonia delivered (FIG. 3).

If it is desired to refill the tank 44 with anhydrous ammonia, the anhydrous ammonia can be delivered directly into the tank 44 through an inlet 208 provided on the tank 44 (FIG. 1). If it is desired to use the pulling vehicle 12 for another use, the quick-disconnect type couplings 164 and 174 may be disconnected, along with any other electrical systems or other couplings, including the tool bar hitch 92 between the pulling vehicle 12 and tool bar 14 (FIGS. 1 and 4). The pulling vehicle 12 can then be pulled forward and all of the connections between the pulling vehicle 12 and the tank 44, such as the excess flow valve 90 to the pump 80 and the bolts 46, can be disconnected. To release the bolts 46, the nuts 50 of the bolts 46 are loosened and the bolts 46 are pivoted upward and out of the V-shaped retainers 54. A crane (not shown) or other device may then be used to lift the tank 44 from the pulling vehicle 12 so that the pulling vehicle 12 may be used for other purposes.

Although the invention has been described with respect to a preferred embodiment thereof, it is to be understood that it is not to be so limited, since changes and modifications can be made therein which are within in the full intended scope of this invention as defined by the appended claims. For example, it is anticipated that various materials may be applied with the present invention and that additional liquid containers may be secured to the pulling vehicle 12 so that application of a plurality of materials may be controlled with the CPU 158 of the applicator 10. It is additionally anticipated that tool bars of various dimensions and row widths may be utilized with the applicator 10 of the present invention.

What is claimed is:

1. A vehicle for applying anhydrous ammonia to soil comprising:
   (a) a chassis including:
      (i) a frame;
      (ii) a front wheel coupled to said frame;
      (iii) a rear wheel coupled to said frame; and
      (iv) means for driving at least one wheel selected from the group consisting of said front wheel and said rear wheel;
   (b) tank means supported by said chassis for storing liquid anhydrous ammonia;
   (c) an agricultural implement coupled to said chassis and pulled thereby and including means for applying anhydrous ammonia to the soil;
   (d) means on said chassis for pumping liquid anhydrous ammonia from said tank means to said applying means on said agricultural implement;
   (e) a video camera mounted on said chassis;
   (f) a video monitor mounted on said chassis and electrically connected to receive video signals from said camera; and
   (g) said camera being directed at said agricultural implement for monitoring the application of anhydrous ammonia by said applying means.

2. The vehicle of claim 1, further comprising a cab provided on said chassis around said video monitor.

3. The vehicle of claim 2 wherein said video camera is located outside of said cab.

4. The vehicle of claim 1 wherein said video camera is positioned at least one meter from said video monitor.

5. The vehicle of claim 1 wherein said video camera is positioned facing a direction within one hundred and eighty degrees of the direction which said video monitor is facing.

6. The vehicle of claim 1, further comprising a cover provided around said video camera, said cover comprising:
   (a) a substantially airtight shell; and
   (b) a window provided in said shell.

7. The vehicle of claim 6 further comprising means for clearing said window of debris.

8. The vehicle of claim 7 wherein said clearing means includes an air hose directed at said window and a hydraulically driven air pump system for supplying a stream of air to said air hose.

9. The vehicle of claim 1, further comprising means for panning said video camera.

10. The vehicle of claim 9, further comprising a cab provided on said chassis around said video monitor, further comprising means for controlling said panning means, said panning controlling means being located within said cab and wherein said panning means is located outside of said cab.

11. The vehicle of claim 10 wherein said controlling means is a joystick.

* * * * *